June 4, 1929.  G. F. JONES  1,715,708
CIRCUIT INTERRUPTER TRIPPING SYSTEM
Filed April 12, 1926
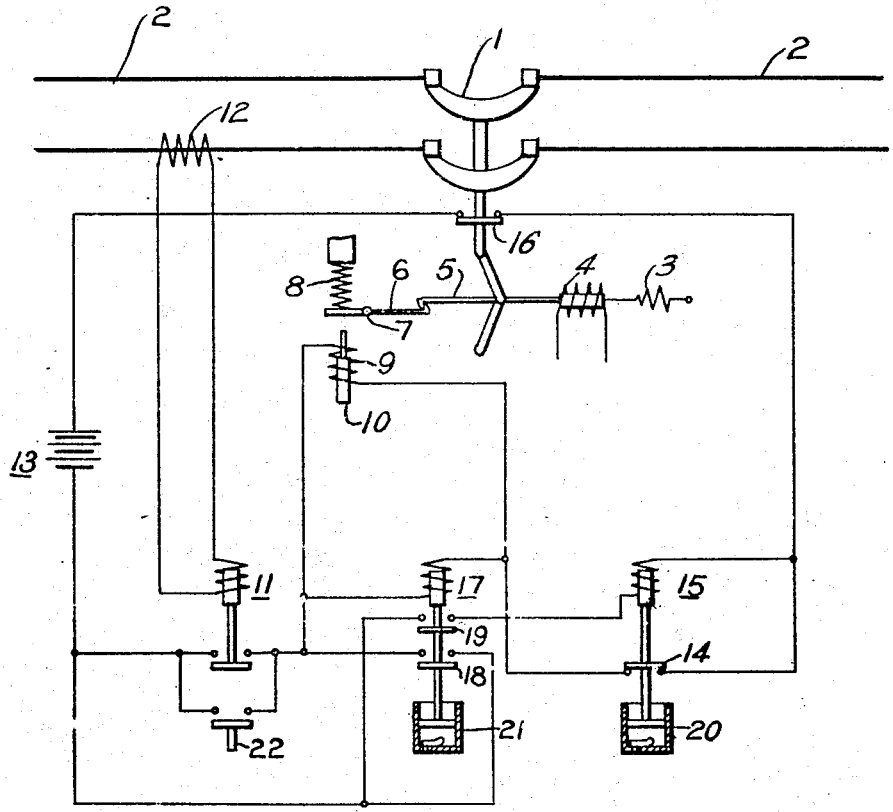
WITNESSES:
INVENTOR
Gordon Franklin Jones.
BY
ATTORNEY Patented June 4, 1929.

1,715,708

UNITED STATES PATENT OFFICE.

GORDON F. JONES, OF IRWIN, PENNSYLVANIA, ASSIGNOR TO WESTINGHOUSE ELECTRIC & MANUFACTURING COMPANY, A CORPORATION OF PENNSYLVANIA.

CIRCUIT-INTERRUPTER TRIPPING SYSTEM.

Application filed April 12, 1926. Serial No. 101,307.

My invention relates to circuit interrupter tripping systems and particularly to automatically controlled electrical tripping systems.

The object of my invention is to provide an automatically controlled electrical tripping system for a circuit interrupter whereby repeated actuations of the tripping means are effected when a single actuation thereof does not accomplish the desired result, namely, the tripping of the circuit interrupter.

My invention will be better understood by reference to the following description taken in connection with the accompanying drawing, the single figure of which is a diagrammatic representation of an electrical system embodying my invention.

Referring to the drawing, a circuit interrupter 1 is connected between two portions of an electric circuit 2. The circuit interrupter 1 is biased toward its open position by a tension spring 3 and is adapted to be actuated to its closed position in response to the energization of a closing coil 4. A latching member 5 that is secured to the actuating mechanism of the circuit interrupter 1 is adapted to be engaged by a corresponding latching member 6 when the circuit interrupter 1 is in its closed position.

The latching member 6 is supported by a pivot 7 and is normally adapted to be held in engagement with the latching member 5 by a compression spring 8. A trip coil 9 is provided with a vertical solenoid plunger 10, the upper end of which strikes against the latching member 6 to disengage the same from the latching member 5 when the coil 9 is energized. The plunger 10 is normally out of engagement with the latching member 6 and is separated therefrom by a sufficient distance to permit the plunger to attain a considerable momentum before striking the latching member 6 in response to energization of the coil 9. Thus, the plunger 10 effects disengagement of the latching members 5 and 6 by a hammering action.

An overload relay 11, the coil of which is connected to the secondary winding of a current transformer 12 that is associated with the main circuit 2, is provided with a switch that is adapted, when closed, to effect energization of the trip coil 9. The energizing circuit for the trip coil 9 extends from the lower terminal of a battery 13 or other suitable source of energy through the switch of the overload relay 11, the trip coil 9, a normally-closed switch 14 of a time-delay relay 15, and an auxiliary switch 16 of the circuit interrupter 1 to the upper terminal of the battery 13. The auxiliary switch 16 is closed when the circuit interrupter 1 is closed and is open when this circuit interrupter is open.

A second time-delay relay 17 is provided with an operating coil that is connected in parallel relation to the trip coil 9. The relay 17 also comprises two switches 18 and 19 which are open when the operating coil of this relay is deenergized. Each of the relays 15 and 17 is adapted to be actuated to its energized position immediately upon the energization of its operating coil, but the return of these relays to their deenergized positions upon the deenergization of the operating coils is delayed by dash-pots 20 and 21, respectively, or other suitable retarding means.

The necessary retarding effect of the dash-pots 20 and 21 may be determined in accordance with the requirements of the particular installation, but ordinarily, any relatively slight retardation, such as a delay of one second or less, will be sufficient.

The switch 18 of the time-delay relay 17 is connected in parallel relation to the switch of the overload relay 11 in the energizing circuit of the trip coil 9 and the operating coil of the relay 17. A manually operable switch 22 is also connected in parallel relation to the switch of the overload relay 11, whereby energization of the trip coil 9 may be effected manually as well as automatically. It will be understood that switches that are closed in response to any other desired conditions may also be connected in parallel relation to the switch of the overload relay 11 to effect energization of the trip coil 9 in response to any desired conditions.

The switch 19 of the relay 17 is connected in series with the operating coil of the relay 15 and the auxiliary switch 16 of the circuit interrupter 1. Thus the operating coil of the relay 15 is energized in response to the actuation of the relay 17 to its energized position at any time while the circuit interrupter 1 is closed.

In describing the operation of the system embodying my invention, let it first be assumed that the circuit interrupter 1 is in its closed position and is held in this position by reason of the fact that the latching members 5 and 6 are in engagement as shown in the drawing. Upon the occurrence of an overload or short-circuit in the circuit 2 the operating coil of the overload relay 11 is sufficiently energized to cause this relay to close its switch.

The energizing circuit of the trip coil 9 is thereby completed from the lower terminal of the battery 13 through the switch of the overload relay 11, the switch 14 of the time-delay relay 15, and the auxiliary switch 16 of the circuit interrupter 1 to the upper terminal of the battery 13. The solenoid plunger 10 of the trip coil 9 is thereupon caused to strike forcibly against the latching member 6. This blow is ordinarily sufficient to actuate the latching member 6 out of engagement with the latching member 5 to permit the circuit interrupter 1 to be actuated to its open position by the tension spring 3.

If the latching member 6 fails to disengage the latching member 5, however, or if, for any reason, the closing coil 4 of the circuit interrupter 1 should be energized when the latching member 6 disengages the latching member 5, the circuit interrupter 1 will remain in its closed position. Under such conditions, it is necessary to cause the plunger 10 to strike a second blow against the latching member 6 in order to cause the circuit interrupter 1 to be opened. Before this can be accomplished effectively, it is necessary that the trip coil 9 be momentarily deenergized to permit the plunger 10 to return to its normal position. This is accomplished by the operation of the relays 15 and 17.

At the same time that the trip coil 9 is energized in response to the operation of the overload relay 11, the operating coil of the time-delay relay 17 is also energized, since this coil is connected in parallel relation to the trip coil 9. The relay 17 is therefore actuated to its energized position at the same time that the plunger 10 is actuated into engagement with the latching member 6. When the relay 17 is in its energized position, its switch 18 is closed to complete a temporary holding circuit in parallel relation to the switch of the overload relay 11, and its switch 19 is closed to complete the energizing circuit of the time-delay relay 15.

By the time that the plunger 10 has struck against the latching member 6, the operating coil of the relay 15 is thus energized to cause this relay to open its switch 14. The opening of the switch 14 interrupts the energizing circuit for the trip coil 9 and the operating coil of the relay 17, thereby permitting these devices to return to their deenergized positions. The return of the relay 17 to its deenergized position is so retarded by the dash-pot 21 that the opening of the switches 18 and 19 is delayed momentarily. When the switch 19 has opened, however, the operating coil of the relay 15 is deenergized to permit this relay to return to its deenergized position to reclose the switch 14. The closing of the switch 14 is likewise retarded by the dash-pot 20.

By reason of the action of the dash-pots 20 and 21, a sufficient interval of time is interposed between the opening of the switch 14 and the reclosing thereof to insure that the plunger 10 of the trip coil 9 has returned to its normal position. Therefore, upon the reclosing of the switch 14 to energize the trip coil 9 a second time, the plunger 10 is again actuated through its full path of movement to permit it to attain its normal momentum before striking against the latching member 6. If the second blow does not effect opening of the circuit interrupter 1, the same cycle of events will be repeated to cause a continuous hammering action of the plunger 10 against the latching member 6 as long as the circuit interrupter 1 remains closed. Upon the opening of the circuit interrupter 1, the auxiliary switch 16 thereof is also opened and all of the controlling devices are thereupon deenergized.

From the foregoing description, it will be seen that I have provided means whereby the trip coil plunger of a circuit interrupter will strike repeated hammer blows against the tripping latch thereof so long as the circuit interrupter remains closed during the existence of predetermined abnormal conditions. By utilizing this invention, great losses which have occurred by reason of the failure of a circuit interrupter to open in response to a single actuation of its tripping mechanism may be prevented. It will be readily appreciated that the system embodying my invention is very economical, simple to install, and reliable in its operation.

While I have described a single embodiment of my invention, I do not wish to be limited thereto, as various changes in the types of apparatus and connection of circuits may be made without departing from the spirit and scope of my invention, as set forth in the appended claims.

I claim as my invention:

1. In an electrical system, in combination, a circuit interrupter, means for holding the circuit interrupter closed, tripping means for rendering the holding means ineffective, and means for actuating the tripping means repeatedly until tripping action is effected.

2. In an electrical system, in combination, a circuit interrupter, means for holding the circuit interrupter closed, tripping means for rendering the holding means ineffective, and means responsive to predetermined conditions for effecting repeated actuations of the tripping means so long as the said conditions prevail and the circuit interrupter remains closed.

3. In an electrical system, the combination with a circuit, a circuit interrupter therein, means for holding the circuit interrupter in its closed position, and tripping means for rendering the holding means ineffective, of means comprising a plurality of relay devices for effecting repeated operations of the tripping means.

4. In an electrical system, the combination with a circuit, a circuit interrupter therein, means for holding the circuit interrupter in its closed position, and tripping means for rendering the holding means ineffective, of means comprising two electrically interlocked time-delay relay devices for effecting repeated operations of the tripping means.

5. In an electrical system, the combination with a circuit, a circuit interrupter therein, means for holding the circuit interrupter in its closed position, and tripping means for rendering the holding means ineffective, of a relay device responsive to a predetermined condition of the circuit for effecting an initial operation of the tripping means, and two electrically interlocked relay devices for effecting repeated operations of the tripping means as long as said predetermined conditions of the circuit exist and the circuit interrupter remains closed.

6. A circuit interrupting system comprising an electric circuit, a circuit interrupter therein, means for biasing the circuit interrupter toward its open position, means for closing the circuit interrupter, a latching member for holding the circuit interrupter in its closed position, a plunger adapted to engage the latching member, a solenoid coil for actuating the plunger into engagement with the latching member to cause the same to release the circuit interrupter, an overload relay associated with the electric circuit for effecting energization of the solenoid coil, and two electrically interlocked relay devices for periodically effecting deenergization and reenergization of the solenoid coil.

7. A circuit interrupting system comprising an electric circuit, a circuit interrupter therein, means for biasing the circuit interrupter toward its open position, means for closing the circuit interrupter, a latching member for holding the circuit interrupter in its closed position, a plunger adapted to engage the latching member, a solenoid coil for actuating the plunger into engagement with the latching member to cause the same to release the circuit interrupter, an overload relay associated with the electric circuit for effecting energization of the solenoid coil, and two electrically interlocked relay devices for periodically effecting deenergization and reenergization of the solenoid coil as long as an overload condition exists in the circuit and the circuit interrupter remains in its closed position.

8. A circuit interrupting system comprising an electric circuit, a circuit interrupter therein, means for biasing the circuit interrupter toward its open position, means for closing the circuit interrupter, a latching member for holding the circuit interrupter in its closed position, a plunger adapted to engage the latching member, a solenoid coil for actuating the plunger into engagement with the latching member to cause the same to release the circuit interrupter, an overload relay associated with the electric circuit for effecting energization of the solenoid coil, a slow-releasing relay device connected in parallel relation to the solenoid coil, a second slow-releasing relay device arranged to be energized when the first-mentioned slow-releasing device attains its energized position, and a switch actuated when the second mentioned slow-releasing device is energized to deenergize the solenoid coil and the first-mentioned slow-releasing device.

9. In combination, an electric circuit, circuit controlling means therefor comprising a movable circuit controlling member, means for holding the member in the circuit closing position and means for releasing said holding means, and means operative in response to an abnormal circuit condition for repeatedly actuating the releasing means as long as the abnormal condition lasts and the holding means fails to be released.

10. In combination, an electric circuit, circuit controlling means therefor comprising a circuit controlling member biased for movement to the circuit opening position, means for holding the member in the circuit closing position and means for releasing said holding means, and electromagnetic means operative in response to an abnormal circuit condition for effecting the energization and deenergization of the releasing means alternately as long as the abnormal condition lasts and the holding means fails to be released.

11. In combination, an electric circuit, circuit controlling means therefor comprising a circuit controlling member biased for movement to the circuit opening position, means for holding the member in the circuit closing position and means for releasing the holding means, a protective relay operative in response to a predetermined abnormal circuit condition, and means for repeatedly actuating the releasing means as long as the abnormal condition lasts and the circuit controlling member fails to move from circuit closing position comprising an impulse relay arranged to be energized on operation of the protective relay and to effect energization of the releasing means, and a control relay arranged to be energized on operation of the impulse relay and to effect the deenergization thereof and thereby the deenergization of the releasing means and itself.

In testimony whereof, I have hereunto subscribed my name this 7th day of April 1926.

GORDON F. JONES.